United States Patent
Beausire et al.

(10) Patent No.: US 9,723,943 B2
(45) Date of Patent: Aug. 8, 2017

(54) BEVERAGE PREPARATION MACHINE WITH MOVABLE MIXING CHAMBER

(71) Applicant: NESTEC S.A., Vevey (CH)

(72) Inventors: Cedric Beausire, Bavois (CH);
Jean-Luc Denisart, Cully (CH); Yann Mieville, Pomy (CH); Philippe Baenninger, Epalinges (CH); Olivier Paillard, Les Hopitaux Neufs (FR)

(73) Assignee: Nestec S.A., Vevey (CH)

(*) Notice: Subject to any disclaimer, the term of this patent is extended or adjusted under 35 U.S.C. 154(b) by 783 days.

(21) Appl. No.: 13/926,606

(22) Filed: Jun. 25, 2013

(65) Prior Publication Data
US 2014/0007775 A1   Jan. 9, 2014

(30) Foreign Application Priority Data
Jul. 5, 2012 (EP) .................................. 12175122

(51) Int. Cl.
*A47J 31/00* (2006.01)
*A47J 31/44* (2006.01)
(Continued)

(52) U.S. Cl.
CPC .......... *A47J 31/404* (2013.01); *A47J 31/401* (2013.01); *A47J 31/3614* (2013.01); *A47J 31/46* (2013.01); *B05B 11/3084* (2013.01)

(58) Field of Classification Search
CPC ...... A47J 31/3614; A47J 31/46; A47J 31/057; A47J 31/005; A47J 31/20; A47J 43/145;
(Continued)

(56) References Cited

U.S. PATENT DOCUMENTS

| 5,495,962 | A | * | 3/1996 | Nomura | G01F 11/46 |
| | | | | | 222/240 |
| 5,931,343 | A | * | 8/1999 | Topar | A47J 31/401 |
| | | | | | 222/129.3 |

(Continued)

FOREIGN PATENT DOCUMENTS

| CH | WO 2009144239 A1 | * | 12/2009 | ............ A47J 31/404 |
| CH | WO 2009153157 A1 | * | 12/2009 | .......... A47J 31/3614 |

(Continued)

*Primary Examiner* — Quang D Thanh
*Assistant Examiner* — Hemant Mathew
(74) *Attorney, Agent, or Firm* — K&L Gates LLP

(57) ABSTRACT

A beverage preparation machine comprising a beverage ingredient powder storing container and a mixing chamber. The mixing chamber being movable between a dosing position, where the outlet of the storing container emerges in the mixing chamber inlet, and a mixing position, where the outlet of the storing container does not emerge in the mixing chamber inlet. The dosing position being placed at a lower vertical position than the mixing position, and wherein the machine comprises an auger at the bottom of the beverage ingredient powder storing container configured for guiding a dose of powder to the outlet of the storing container. The machine also comprises a door at the outlet of the storing container, the door being configured so that when the mixing chamber moves to the dosing position the movement of the mixing chamber activates the opening of the door and when the mixing chamber moves to the mixing position the movement of the mixing chamber induces the closure of the door.

10 Claims, 4 Drawing Sheets

(51) Int. Cl.
  *B67D 7/70*   (2010.01)
  *A47J 31/40*  (2006.01)
  *B05B 11/00*  (2006.01)
  *A47J 31/36*  (2006.01)
  *A47J 31/46*  (2006.01)

(58) Field of Classification Search
  CPC ...... A47J 31/404; A47J 31/405; A47J 31/401;
       A47J 31/44; A47J 31/4403; A23G 9/045;
       B05B 11/3084; B05B 11/3056; B65D
       21/0231; G01F 11/266; G01F 13/005
  USPC ..... 99/289 R, 275, 290, 300, 484, 279, 287;
       222/135, 143, 71, 162, 412, 413
  See application file for complete search history.

(56)        References Cited

U.S. PATENT DOCUMENTS 6,202,894   B1 *  3/2001  Struminski .......... B67D 1/0037
                                                       222/129.3
  2011/0076371 A1 *  3/2011  Deolarte ............ A47J 31/401
                                                       426/433
  2012/0024160 A1 *  2/2012  Van Os .................. A47J 31/42
                                                       99/280

FOREIGN PATENT DOCUMENTS

DK    WO 02064006 A1 *  8/2002  ............ A47G 19/34
  FR         1475352       3/1967
  WO        2009153157    12/2009

* cited by examiner

BEVERAGE PREPARATION MACHINE WITH MOVABLE MIXING CHAMBER

PRIORITY CLAIM

This application claims the benefit of and priority to European Patent Application No. 12175122.6 filed on Jul. 5, 2012, the entire disclosure of which is hereby incorporated by reference.

BACKGROUND

The present invention relates to a machine preparing beverages by mixing a beverage soluble powder and a diluent.

WO 2009/153157 describes a beverage dispensing machine preparing a beverage by dosing a dose of a beverage powder ingredient and delivering the dose in a mixing chamber wherein the powder is mixed with a diluent. The mixing chamber is movable between a first metering position where it is placed under the outlet of the dosing device to receive the powder dose and a second mixing position that is distant from the first position where the diluent is introduced in the mixing chamber and the beverage is prepared and delivered. This machine presents the advantage of avoiding the problem of steam introduction in the dosing device since the diluent is introduced in the mixing chamber when said chamber is not positioned near from the dosing device. WO 2009/144239 describes a dosing device that can be implemented in such a beverage dispensing machine.

This machine usually works efficiently for preparing coffee beverages starting from an instant coffee powder if the coffee powder is not too fine like a freeze-dried instant coffee powder. But when the machine is used with a fine coffee powder like a spray-dried instant coffee powder either agglomerated or micro-agglomerated, it has been observed inconsistency in the dosing and dirtiness in the dosing device. These issues are apparently linked to the presence of instant coffee fines in the mechanism of the dosing device and to the high sensitivity of these fines to steam or vapour around the machine. These issues are intensified if the beverage machine is used in tropical conditions (e.g. with a relative humidity of 70% at 30° C.): the machine can be clogged within a week. Consequently it is not possible to use spray-dried instant coffee with the above machine. Yet it would be an advantage if the machine could be used with any type of instant coffee whatever its properties.

The present invention solves this issue and improves the beverage dispensing machine of the state of the art so that it can be efficiently used with any type of instant coffee and in any climate conditions.

SUMMARY

According to an embodiment, the invention concerns a beverage preparation machine comprising:
  a beverage ingredient powder storing container,
  a mixing chamber, said mixing chamber being movable between:
  a dosing position, where the outlet of the storing container emerges in the mixing chamber inlet, and
  a mixing position, where the outlet of the storing container does not emerge in the mixing chamber inlet.
  the dosing position being placed at a lower vertical position than the mixing position, and wherein the machine comprises an auger at the bottom of the beverage ingredient powder storing container configured for guiding a dose of powder to the outlet of the storing container, and wherein the machine comprises a door at the outlet of the storing container, said door being configured so that when the chamber moves to the dosing position the movement of the chamber activates the opening of said door and when the chamber moves to the mixing position the movement of the chamber induces the closure of the door.

As the mixing chamber of the machine is conceived for the dissolution of soluble beverage ingredients in a diluent, it presents at least an upward wall and a bottom wall with a beverage outlet in the bottom of the mixing chamber. In its simpler form the mixing chamber is a container with a bottom outlet. Such a chamber provides the function of a container that can receive simultaneously a soluble ingredient and a diluent so that by contact the soluble ingredient dissolves in the diluent and also the function of dispensing the beverage issued from the dissolution of the soluble ingredient through an outlet by gravity fall generally directly in a drinking cup.

The mixing chamber can take various shapes. In a preferred mode, the upward wall is substantially cylindrical. Other shapes could be envisaged such as a polygonal, e.g., hexagonal, or oval section of the chamber, for instance. The bottom wall can be substantially a portion of truncated cone. This shape enables to improve the distribution of liquid in a layer which rises along the upward wall of the chamber as a result of the centrifugal effect on the liquid, imparted by the diluent jet. The mixing chamber usually comprises an inlet opening for the introduction of soluble ingredient. Usually, the inlet of the mixing chamber is on the top of the chamber so that soluble ingredient can be introduced by gravimetric fall inside the mixing chamber. Preferably the mixing chamber is rotor free.

According to the present invention, the mixing chamber of the machine can move between two positions. The movement between these two positions concerns the whole of the mixing chamber elements that are the upward wall, the bottom wall and the outlet. The mixing chamber moves backwards and forwards between these two positions each time a beverage is prepared. In the first dosing position, the place of the mixing chamber is such that the outlet of the storing container emerges in the mixing chamber top inlet; the storing container outlet can also cooperates with the mixing chamber top inlet by the means of a pipe or a funnel. In the second mixing position, the diluent feeding means are able to inject the diluent in the mixing chamber and the outlet of the storing container does not emerge anymore in the mixing chamber. These two positions of the mixing chamber are sufficiently distant so that it is not possible to have the outlet of the storing container emerging in the mixing chamber while the diluent feed means feed diluent in the mixing chamber: either, in one position, the outlet of the storing container emerges in the mixing chamber and no diluent can be fed in the mixing chamber or, in a second position, the outlet of the storing container does not emerge in the mixing chamber and the diluent can be fed in the mixing chamber.

Due to this configuration, when the diluent is introduced in the mixing chamber, the generated steam does not rise in the metering device. Generally in the metering position, the mixing chamber inlet opening is below the metering device because it is advantageous to take profit of the gravity force to let soluble ingredient falls in the mixing chamber.

According to the invention, the dosing position is placed at a lower vertical position than the mixing position which also avoids the presence of steam or humidity around the dosing position.

According to an embodiment, the machine comprises a door opening assembly. Said door opening assembly is preferably actuated by a part of the chamber. In the door opening assembly, the door can be connected to a lever by means of articulated connecting rods. Preferably the lever is placed on the path of the movable chamber.

Preferably the outlet of the storing container is surrounded by a seal on which the door can lean when the outlet is closed. According to an embodiment:

the outlet is a cylinder, the seal is a ring present on the external surface of said cylinder, and the door side facing the storing container outlet presents a peripheral rising edge, said edge being configured to lean on the seal when the outlet is closed.

The outlet can be a cylinder of which extremity presents a bottom half moon weir. According to this last embodiment, the door side facing the outlet can present an embossment configured for cooperating with the bottom half moon weir of the outlet cylinder extremity and for closing the outlet cylinder extremity above said half moon weir.

The outlet can be a subassembly of the storing container and can be dismantled from the storing container. Preferably said outlet subassembly comprises the door opening assembly.

According to an embodiment, the auger at the bottom of the beverage ingredient powder storing container is oriented so as to drive the beverage ingredient powder upwardly. Preferably the axis of the auger presents an angle comprised between 15 and 25° with horizontal.

The mixing chamber can be moved according to a linear movement. Preferably the mixing chamber is movable according to a helicoidal movement.

According to an embodiment, the machine can comprise a support for holding the mixing chamber and the holder is movable to move the mixing chamber between the dosing and the mixing position. Preferably the mixing chamber can be removed from the holder in particular for cleaning.

Additional features and advantages are described herein, and will be apparent from the following Detailed Description and the figures.

BRIEF DESCRIPTION OF THE FIGURES

The characteristics and advantages of the invention will be better understood in relation to the following figures.

DETAILED DESCRIPTION

Figure 1:
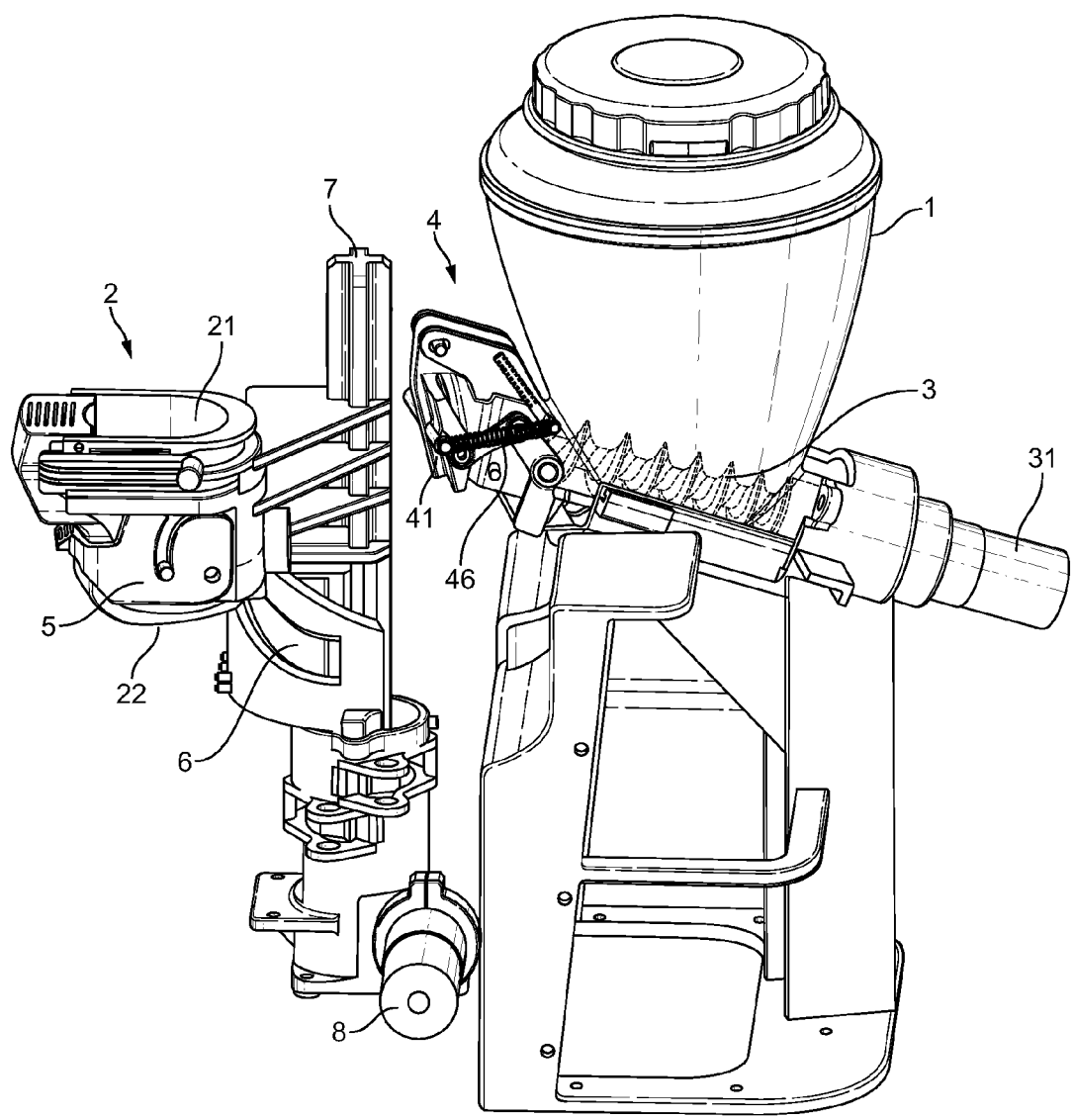
FIG. 1 is a view of the internal parts of a beverage preparation machine according to the present invention with the mixing chamber and the door opening assembly positioned for the mixing operation.
Figure 2:
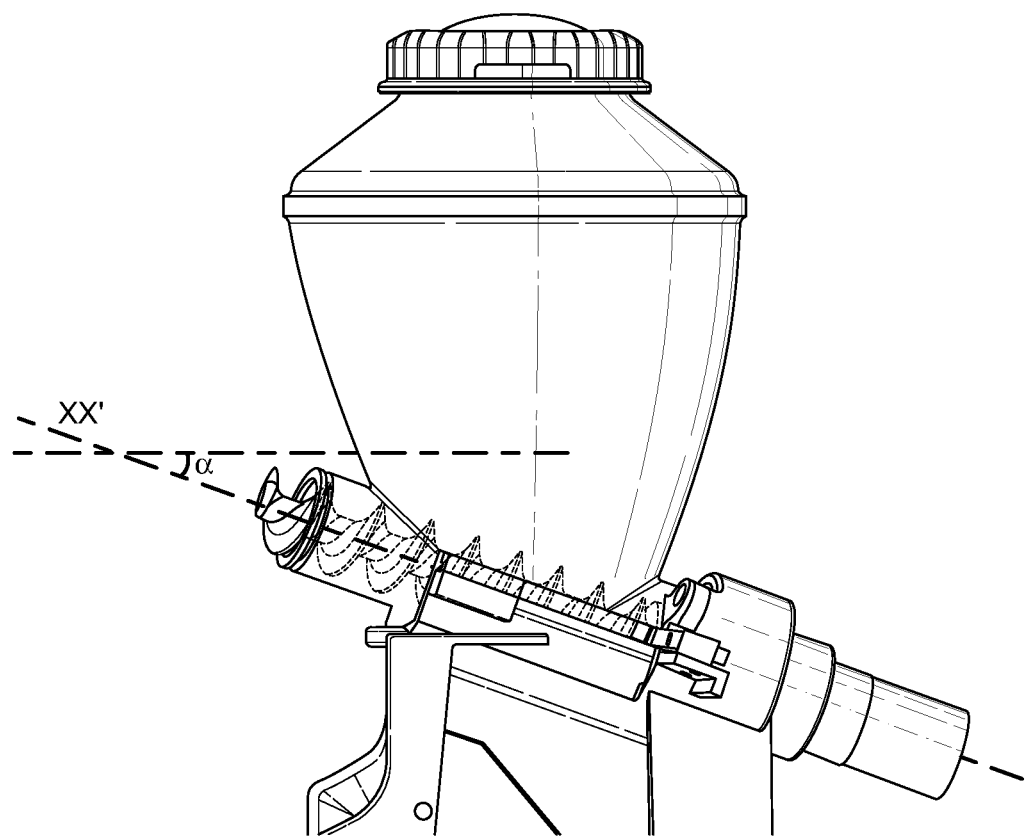
FIG. 2 is a view of the dosing and storing devices of the beverage preparation machine of FIG. 1.

FIG. 1 illustrates a beverage preparation machine according to the invention from which housing panels have been removed to make internal parts apparent. The machine comprises a beverage ingredient powder storing container 1 which has been made transparent in FIG. 1. A device for dosing the powder is placed at the bottom of the container 1. In the illustrated embodiment this dosing device is a screw auger 3 actuated by a motor 31, yet any other auger like spring auger could be used. The axis XX' of the auger is preferably oriented so as to drive the beverage ingredient powder upwardly and as illustrated in axis XX' preferably presents an angle α of about 20° with horizontal. The screw auger 3 at the bottom of the beverage ingredient powder storing container 1 guides the powder to the outlet 11 of the storing container. The outlet 11 can be opened or closed by a door 41 by means of a door opening assembly 4. The orientation of the auger axis decreases the chance that powder particles might fall out of the outlet or stay between the outlet and the door when the auger is no more actuated.

The machine comprises a mixing chamber 2 in which a dose of powder and a diluent can be introduced and mixed. The resulting beverage is evacuated through an outlet 22 in the bottom of the mixing chamber. Such a chamber for contacting, dissolving and eventually frothing a diluent and a soluble beverage powder can correspond to the chamber described in WO 2008/071613.

The chamber 2 is movable between:

a first dosing position, where the outlet 11 of the storing container emerges in the mixing chamber top inlet 21, and a second mixing position, where the outlet 11 of the storing container does not emerge in the mixing chamber top inlet.

The mixing chamber 1 is positioned in a holder 5 that can be moved from the first to the second position and reversely and that can drive the mixing chamber accordingly. The holder 5 is attached to a shaft 7 movable in rotation and in translation according to its axis. The shaft can be actuated and rotated by a motor 8. The shaft presents a side pin cooperating with a guiding curve 6, said guiding curve presenting a helicoidal shape. When the rotation of the shaft 7 occurs the shaft 7 is simultaneously able to freely translate in response to the helicoidal movement of the curve. The helicoidal shape of the guiding curve is such that the first dosing position is placed at a lower vertical position than the second mixing position. The displacement of the mixing chamber is optimized so that the top opening of the chamber is positioned under the outlet 11 of the storing container before the movement of the chamber is finished. Consequently there is no risk that powder might fall on the top edges or outside of the mixing chamber.

FIG. 1 illustrates the mixing chamber in its mixing position away from the dosing position, the door 41 of the storing container being closed. In this mixing position the diluent can be introduced in the mixing chamber to dissolve the beverage ingredient dosed by the auger and delivered through the storing container outlet and the door. The resulting beverage is delivered through the chamber outlet 22 usually in a drinking cup placed hereunder. It can be noticed that the mixing position of the chamber is sufficiently high above the dosing position of the chamber so that during mixing operation steam does not rise at the storing container outlet.

Preferably the auger of the storing container is activated only when the mixing chamber is immobilised under the opened outlet.

Figure 3A:
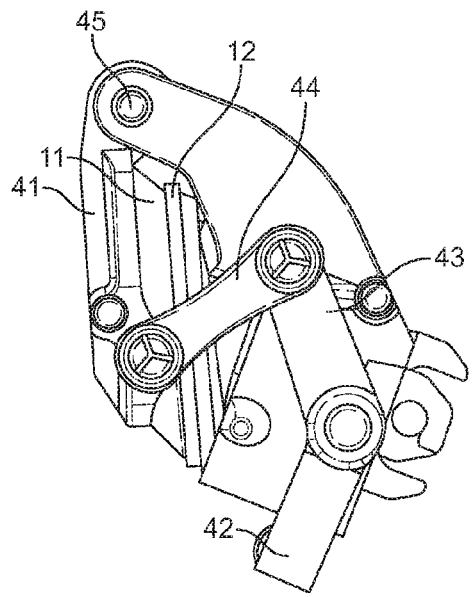
FIGS. 3a, 3b, 3c are complete and partial views of the outlet and the door opening assembly of the beverage preparation machine of FIG. 1.
Figure 3B:
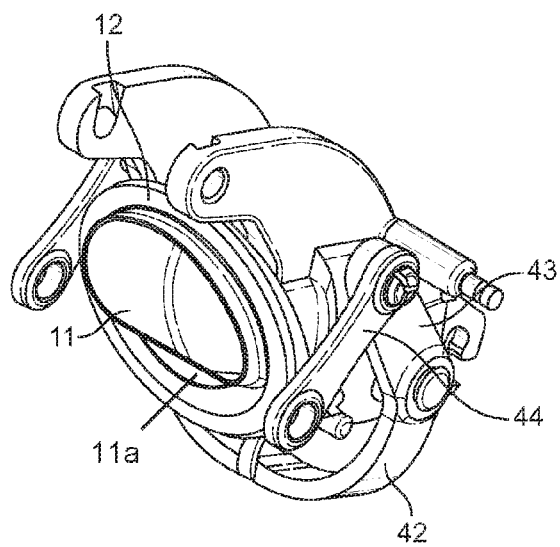
Figure 3C:
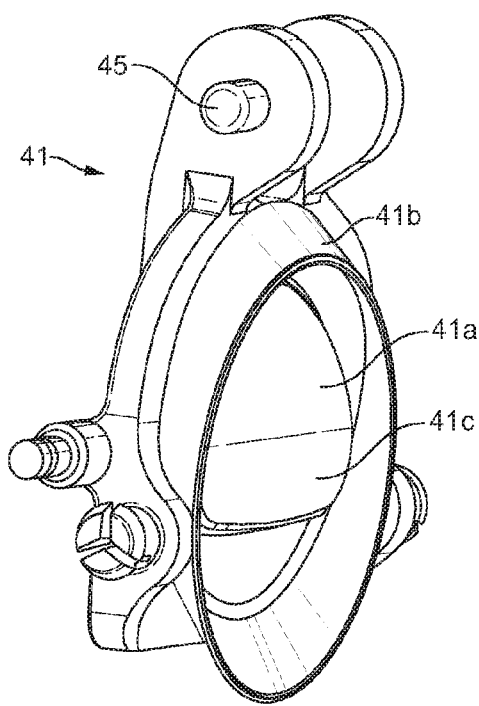
Figure 4:
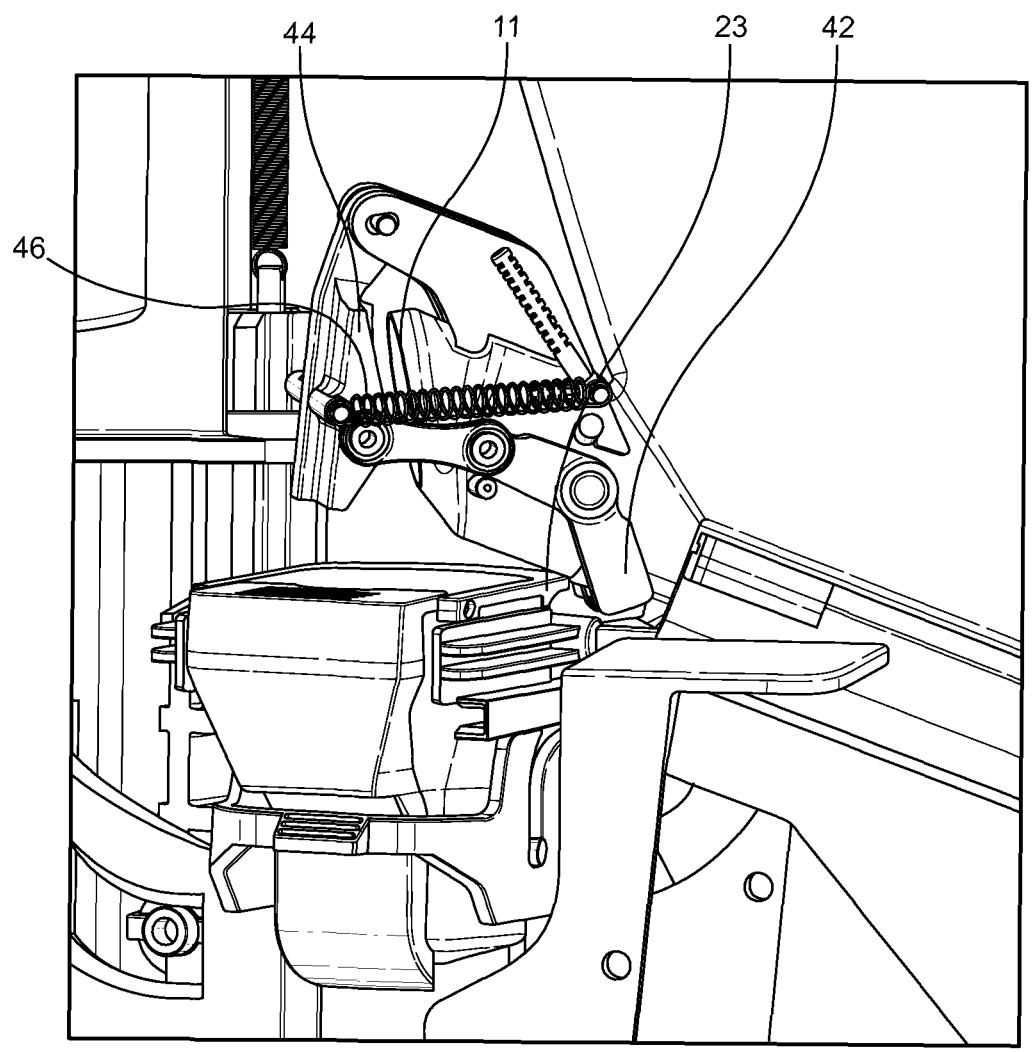
FIG. 4 is a view illustrating the cooperation of the mixing chamber and the door opening assembly during the dosing operation.

The outlet 11 of the storing container and door opening assembly are detailed in FIGS. 3a, 3b and 3c. The door 41 is hinged to an axis 45 of the assembly and is connected to a lever 42 by means of two articulated connecting rods 43,

44. The fact of pushing the lever 42 raises the door 41 and opens the outlet 11. Reciprocally the fact of releasing the lever 42 enables the closure of the outlet 11 by the door 41. According to the invention the door opening assembly cooperates is configured so that when the mixing chamber 2 moves to the dosing position the movement of the mixing chamber activates the opening of the door 41, as illustrated in FIG. 4, and when the mixing chamber moves to the mixing position the movement of the mixing chamber produces the closure of the door 41. Preferably the door opening assembly comprises a tension spring 46 so that the door automatically closed the outlet at rest; this spring 46 is clearly illustrated in FIGS. 1 and 4. According to the preferred illustrated mode the lever 42 is placed on the path of the mixing chamber 2. Then the door opening assembly cooperates and is actuated by a side of the mixing chamber when it moves to the dosing position. This mode presents the advantage that if the chamber 2 is not present in the holder 5—during cleaning for example—then the door opening assembly cannot be actuated and the dose of powder cannot fall in the internal parts of the machine. FIG. 4 shows how the lateral side 23 of the mixing chamber pushes the lever 42 for moving the door 41 away the outlet 11. When the mixing chamber moves back to the mixing position, no more force is exerted on the lever 42; then the tension spring 46 forces the door back for closing the outlet.

The outlet 11 preferably usually presents an essentially circular section. Preferably the outlet comprises a half moon weir 11a to avoid that a part of the next powder dose slides in the mixing chamber when the auger stops being actuated. This enables a more accurate dosing of the powder.

Preferably the outlet 11 of the storing container is surrounded by a seal 12 on which the door 41 leans when the outlet is closed. According to the preferred illustrated mode, the outlet 11 is a cylinder. The seal 12 is a ring present on the external surface of the cylinder. The positioning of the seal on the external surface decreases the chance of having deposit of powder grains on the seal which would affect the good sealing of the door and could enable the introduction of steam in the storing container. The door side 41a facing the outlet presents a peripheral rising edge 41b and said edge is configured to lean on the seal when the outlet is closed. Besides when the outlet 11 comprises a half moon weir 11a, the door side 41a facing the outlet preferably presents a surface that cooperates with the surface of the outlet in order to get an efficient closure of the door; in particular the door side 41a facing the outlet can present an embossment 41c that can slide against the upper edge of the half moon weir during opening and closing of the door.

The configuration of the door, the cylinder extremity and the upwardly orientation of the axis XX of the auger limits the chance that powder may fall on the seal on which the door leans and guarantees a high airtight closure of the door. This configuration particularly helps for avoiding powder to fall when the machine is subjected to vibrations, for example the vibrations of the water pump during the beverage preparation in the mixing chamber.

As illustrated in FIGS. 3a and 3b, the outlet can a subassembly of the storing container 1 and can be dismantled from the storing container, for example for cleaning. This subassembly can be attached to the storing container through a bayonet connection.

The illustrated machine has been used for preparing beverages from a freeze dried coffee powder during one month in tropical conditions (30° C., 70% humidity) without observing clogging issues of the dosing means.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A beverage preparation machine comprising:
   a beverage ingredient powder storing container;
   a mixing chamber movable between (i) a dosing position where an outlet of the beverage ingredient powder storing container emerges in an inlet of the mixing chamber and (ii) a mixing position where the outlet of the beverage ingredient powder storing container does not emerge in the inlet of the mixing chamber, the dosing position placed at a lower vertical position than the mixing position;
   an auger at a bottom of the beverage ingredient powder storing container, the auger configured for guiding a dose of beverage ingredient powder to the outlet of the beverage ingredient powder storing container;
   a door at the outlet of the beverage ingredient powder storing container, the door configured so that when the mixing chamber moves to the dosing position, the movement of the mixing chamber activates opening of the door, and when the mixing chamber moves to the mixing position, the movement of the mixing chamber moves the door into a closed position in which the door closes the outlet of the beverage ingredient powder storing container; and
   an assembly to which the door is hingedly connected, the assembly comprising a lever to which the door is connected by articulated connecting rods, the lever positioned on a path of the mixing chamber between the mixing position and the dosing position such that the mixing chamber pushes the lever as the mixing chamber moves to the dosing position and does not exert force on the lever when the mixing chamber has moved back to the mixing position.

2. The beverage preparation machine of claim 1, wherein the outlet of the beverage ingredient powder storing container is surrounded by a seal on which the door leans when the outlet is closed.

3. The beverage preparation machine of claim 2, wherein the outlet of the beverage ingredient powder storing container is a cylinder, the seal is a ring present on an external surface of the cylinder, and a door side facing the outlet presents a peripheral rising edge, the peripheral rising edge being configured to lean on the seal when the outlet is closed.

4. The beverage preparation machine of claim 1, wherein the outlet of the beverage ingredient powder storing container is a cylinder of which an extremity presents a bottom half moon weir.

5. The beverage preparation machine of claim 4, wherein a door side facing the outlet presents an embossment configured for cooperating with the bottom half moon weir of the extremity and for closing the extremity above the bottom half moon weir.

6. The beverage preparation machine of claim 1, wherein the outlet of the beverage ingredient powder storing container is a subassembly of the beverage ingredient powder storing container and is able to be dismantled from the beverage ingredient powder storing container.

7. The beverage preparation machine of claim 6, wherein the subassembly comprises the assembly.

8. The beverage preparation machine of claim 1, wherein the auger at the bottom of the beverage ingredient powder storing container is oriented to drive the beverage ingredient powder upwardly.

9. The beverage preparation machine of claim 1, wherein the door pivots within the outlet.

10. The beverage preparation machine of claim 1, wherein the door is automatically closed when the beverage preparation machine is at rest.

* * * * *